United States Patent [19]

Murakami et al.

[11] Patent Number: 4,710,333
[45] Date of Patent: Dec. 1, 1987

[54] PROCESS FOR CONTINUOUS PREPARATION OF SYNTHETIC RESIN PLATES HAVING IRREGULAR FLOW PATTERN OF DIFFERENT COLORS

[75] Inventors: Saburo Murakami; Shoji Kinashi; Toyokazu Ego, all of Toyama, Japan

[73] Assignee: Mitsubishi Rayon Co., Ltd., Tokyo, Japan

[21] Appl. No.: 793,639

[22] Filed: Oct. 31, 1985

[30] Foreign Application Priority Data

May 24, 1985 [JP] Japan .................. 60-110117

[51] Int. Cl.$^4$ .......................................... B29C 39/20
[52] U.S. Cl. .................................... 264/73; 264/75; 264/171; 264/216; 264/245; 264/347; 425/131.1; 425/224; 425/371
[58] Field of Search .................. 264/73, 75, 171, 166, 264/165, 216, 245, 347; 425/325, 131.1, 132, 371, 224

[56] References Cited

U.S. PATENT DOCUMENTS

| | | | |
|---|---|---|---|
| 3,488,246 | 1/1970 | Duggins | 264/75 |
| 3,518,333 | 6/1970 | Adey et al. | 264/70 |
| 3,529,325 | 9/1970 | Duggins | 425/89 |
| 3,562,379 | 2/1971 | Duggins | 264/171 |
| 3,570,056 | 3/1971 | Hall et al. | 425/325 |
| 3,592,882 | 7/1971 | Morita | 264/75 |
| 3,706,825 | 12/1972 | Hall et al. | 264/75 |
| 3,894,826 | 7/1975 | Kato | 264/216 |
| 4,133,861 | 1/1979 | Kato | 425/224 |
| 4,232,078 | 11/1980 | Kamada | 264/216 |
| 4,254,074 | 3/1981 | Toyooka et al. | 264/216 |

FOREIGN PATENT DOCUMENTS

| | | | |
|---|---|---|---|
| 2485067 | 12/1981 | France | 264/73 |
| 47-33495 | 8/1972 | Japan . | |
| 47-33496 | 8/1972 | Japan . | |
| 52-12272 | 1/1977 | Japan | 425/371 |
| 53-123468 | 10/1978 | Japan | 264/165 |
| 60-9714 | 1/1985 | Japan . | |

Primary Examiner—Jeffery Thurlow
Attorney, Agent, or Firm—Kenyon & Kenyon

[57] ABSTRACT

Synthetic resin plates having an irregular flow pattern of different colors are prepared by continuously polymerizing polymerizable materials in a polymerization zone defined by confronting surfaces of two confronting and running endless belts and gaskets held between the confronting surfaces of the belts. Polymerizable materials of different colors are supplied in the polymerizable material supply region close to the upstream end of the polymerization zone by a plurality of supply means, each of which includes at least one polymerizable material supply opening to the polymerizable material supply region. The supply means are arranged in such a manner that they are spaced from one another in the direction of travel of the belts. The supply of the polymerizable material is carried out while at least one of the supply means is reciprocated in the width direction of the belts, and the colors of the colored polymerizable materials supplied from at least two of the supply means are made different from each other or the colored polymerizable material supplied from at least one of the supply means is formed into a laminar flow composed of a plurality of polymerizable materials differing in color.

5 Claims, 11 Drawing Figures

PROCESS FOR CONTINUOUS PREPARATION OF SYNTHETIC RESIN PLATES HAVING IRREGULAR FLOW PATTERN OF DIFFERENT COLORS

BACKGROUND OF THE INVENTION

1. Field of the Invention

The present invention relates to a process for the continuous preparation of synthetic resin plates having an irregular flow pattern of different colors.

2. Description of the Related Art

A plate of different colors having a color pattern on the surface thereof is known, and plates of this type are prepared according to various processes. For example, there can be mentioned a process in which a plate is formed and a pattern is printed on the plate by using paints differing in color, and a process in which a film having a color pattern printed thereon is bonded to a plate. However, plates of different colors prepared according to these conventional processes have a poor durability and the colored surface film is liable to be separated from the surface of the plate by an external force or with the lapse of time. Moreover, when such a plate is subjected to heating or drawing, wrinkles are formed because of the difference in stretchability between the surface color film and the base plate, or the color becomes thin in the drawn portion and the color difference between the drawn portion and the undrawn portion becomes prominent, resulting in degradation of the aesthetic effect.

Processes for the preparation of plates of different colors are disclosed in U.S. Pat. Nos. 3,488,246, 3,529,325, 3,562,379, 3,570,056, and 3,706,825, and Japanese Unexamined Patent Publication No. 60-9714. According to the teachings of these U.S. patents, a polymerizable liquid material including a filler and a colorant and having a high viscosity is appropriately mixed with a colorant liquid having a low viscosity by using a three-staged mixing means, and the polymerizable liquid material is polymerized and cured to obtain an opaque plate-shaped product having a pattern resembling a marble pattern. The characteristic feature of this preparation process resides in that the polymerizable material is appropriately mixed. However, the pattern is changed according to the concentration, viscosity and flow rate, and the state of the mixer, and the probability of the formation of a predictable pattern on the surface of the plate is low. It is thus difficult to produce an aesthetic color pattern with a good reproducibility. ducibility. The technique disclosed in Japanese Unexamined Patent Publication No. 60-9714 is one developed by us. According to this technique, at least two polymerizable liquid materials differing in color are extruded from two groups of flow paths, the outlets of which are combined alternately, and are introduced into a polymerization apparatus where the materials are polymerized and cured to obtain a plate having a linear pattern. A plate of different colors obtained according to this technique has only a linear pattern or grain pattern, and the fashion and design characteristics of the plate are not attractive.

SUMMARY OF THE INVENTION

In view of the above, it is a primary object of the present invention to provide a process for the continuous preparation of synthetic resin plates having an irregular flow pattern of different colors, which has excellent fashion and design characteristics.

In accordance with the present invention, there is provided a process for the preparation of synthetic resin plates having an irregular flow pattern of different colors (hereinafter referred to as "different color flow pattern plates") by continuously polymerizing polymerizable materials in a polymerization zone defined by confronting surfaces of two confronting and running endless belts and gaskets running in follow-up with the belts in the vicinity of both the side ends of the belts in the state held between the confronting surfaces of the belts, wherein polymerizable materials of different colors are supplied in the polymerizable material supply region close to the upstream end of the polymerization zone by a plurality of supply means, each supply means including at least one polymerizable material supply opening to the polymerizable material supply region, the supply means being arranged in such a manner that they are spaced from one another in the direction of travel of the belts.

The supply of the polymerizable material is carried out while at least one of the supply means is reciprocated in the width direction of the belts, and the colors of the colored polymerizable materials supplied from at least two of the supply means are made different from each other or the colored polymerizable material supplied from at least one of the supply means is formed into a laminar flow composed of a plurality of polymerizable materials differing in color.

DESCRIPTION OF THE PREFERRED EMBODIMENTS

The preparation process of the present invention will now be described with reference to the accompanying drawings.

Figure 8:
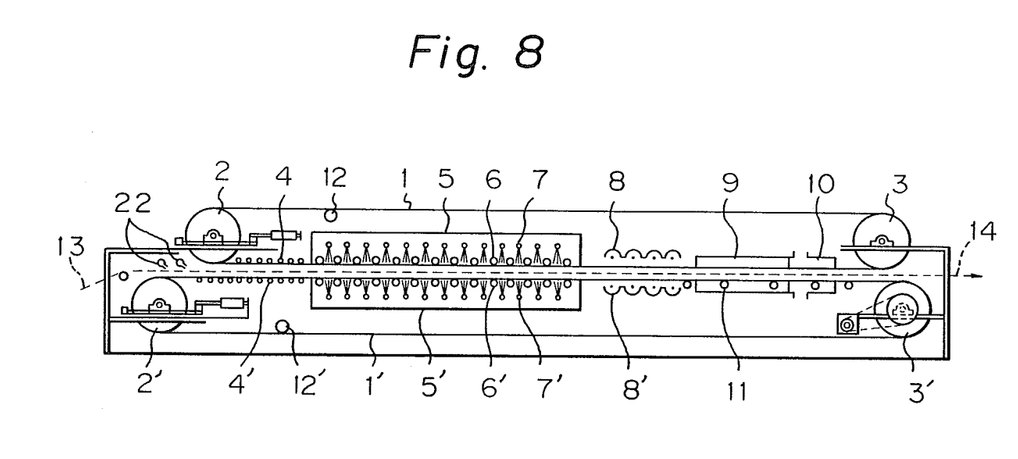
FIG. 8 is a front view illustrating an example of the continuous plate-preparing apparatus comprising confronting belts, which is used in carrying out the process of the present invention.

FIG. 8 illustrates an example of the continuous plate-preparing apparatus for use in carrying out the process of the present invention, in which the main member of this apparatus consists of two endless belts 1 and 1' having confronting surfaces. Metal belts composed of steel or stainless steel are ordinarily used. One surface of each of the upper and lower belts 1 and 1' is polished, and a tension is given to the belts 1 and 1' by pulleys 2, 3, 2' and 3' and these belts 1 and 1' are driven so that they run at the same speed. Each belt is held horizontally. In the confronting molding faces of the respective belts 1 and 1' (i.e., belt surfaces running between the pulleys 2 and 2' and the pulleys 3 and 3'), a polymerization zone, that is, a molding space, is defined by gaskets 13 gripped firmly between the confronting surfaces of the belts 1 and 1' and running at the same speed as that of the endless belts 1 and 1'.

Figure 1:
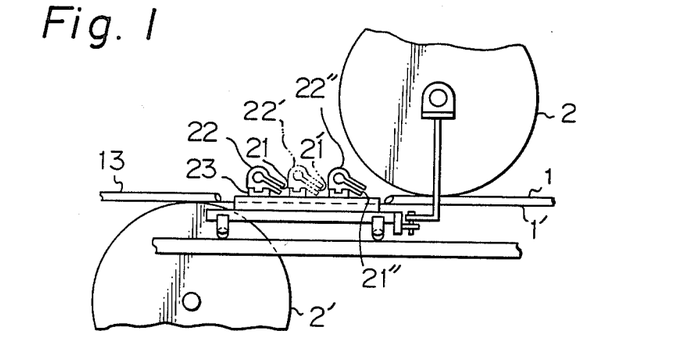
FIG. 1 is a front view illustrating an example of the apparatus for supplying colored polymerizable materials, which comprises a plurality of supply means.
Figure 2:
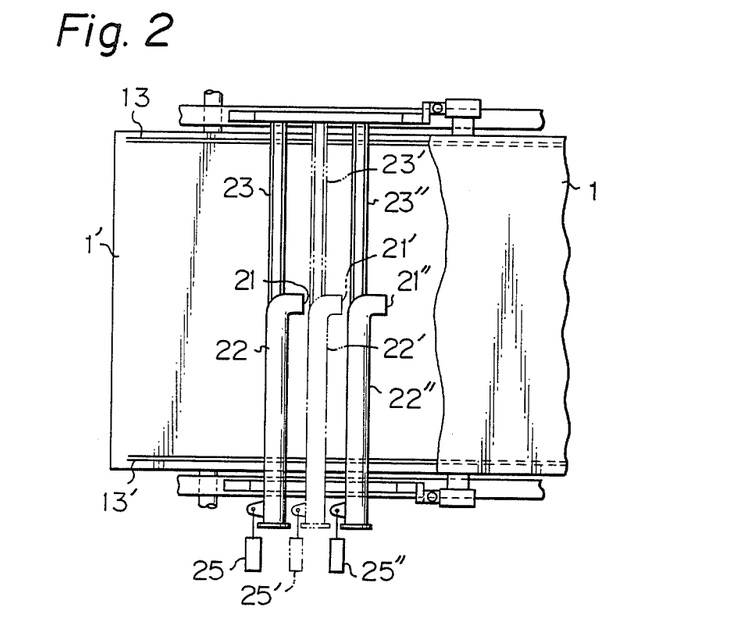
FIG. 2 is a top view of the apparatus shown in FIG. 1.

In a polymerizable material supply region at the upsteam end of this molding space, a plurality (at least two) of supply means 22, 22', and 22" are arranged in such a manner that they are spaced from one another on the top face of the belt 1' with respect to the direction of advance of the belts 1 and 1', as shown in FIGS. 1 and 2, and each of these supply means 22, 22', and 22" has at least one polymerizable material supply opening 21. At least one of the supply means 22, 22', or 22" arranged on the belt 1' is reciprocated in the direction of the width of the belt 1' by a reciprocating device 25, 25', or 25". Note, all of the supply means 22, 22', and 22" may be reciprocated, or at least one of the supply means 22, 22', or 22" may be reciprocated while the remaining supply means are kept stationary and fixed. The respective supply means 22, 22' and 22" are supported by supporters 23, 23', and 23" in such a manner that the desired distances are maintained between every two adjacent supply means. The supply openings 21, 21' or 21" arranged in each supply means may comprise one opening or a plurality of openings. Where a supply means has a plurality of openings, the size and shape of these openings may be the same or different. The size of the opening is not generally defined, but the opening may be a nozzle hole having a diameter of from 2 to 10 mm or a slit having a size of 10 mm × 300 mm.

The gaskets 13 used for defining the molding space may be formed of plasticized polyvinyl chloride, polyethylene, an ethylene/vinyl acetate copolymer, polyurethane or the like. The shape of the gaskets is not particularly critical, and gaskets having a square, oblong or circular section or gaskets having a shape as disclosed in Japanese Examined Patent Publication No. 47-33497 may be used. The gaskets may be either hollow or solid.

A liquid polymerizable material in which a colorant is incorporated is used as the colored polymerizable material in the present invention. The liquid polymerizable material used in the present invention is a partial polymerization product of methyl methacrylate or a mixture comprising a major amount of methyl methacrylate and a minor amount of another copolymerizable monomer (hereinafter referred to as "acrylic syrup"), or a liquid unsaturated polyester.

As the monomer copolymerizable with methyl methacrylate, there can be mentioned methyl acrylate, ethyl acrylate, butyl acrylate, cyclohexyl acrylate, 2-ethylhexyl acrylate, ethyl methacrylate, butyl methacrylate, cyclohexyl methacrylate, 2-ethylhexyl methacrylate, styrene, acrylonitrile, methacrylonitrile, and vinyl acetate. These monomers may be used alone or in the form of a mixture of two or more of them.

The acrylic syrup may be prepared according to a known process. For example, a mixture of a monomer and a polymer, that is, a mixture formed by dissolving an appropriate amount of a polymer in a monomer as described above, or a monomer/polymer mixture obtained by partial polymerization, may be used. The acrylic syrup used in the present invention contains up to 50% by weight of a polymer and has a viscosity of 6 to 40 poise as measured at 20° C.

An unsaturated polyester that can be subjected to cast polymerization is used in the present invention. For example, there may be used liquid compositions formed by incorporating a vinyl compound such as styrene, vinyl acetate, methyl methacrylate or vinyltoluene into an unsaturated polyester obtained by polycondensation of an unsaturated dicarboxylic acid such as maleic anhydride, fumaric acid or itaconic acid with a glycol such as ethylene glycol, diethylene glycol, triethylene glycol, propylene glycol or 1,3-butylene glycol.

As the colorant to be incorporated in the liquid polymerizable material, there can be mentioned dyes, organic and inorganic pigments, coloring additives, and mixtures thereof. As examples of the dye, there can be mentioned anthraquinone and azo dyes, such as Diaresin Red H5, Diaresin Red H, Diaresin Red S, Diaresin Red EL, Diaresin Red LM, Diaresin Yellow HC, Diaresin Yellow A, Diaresin Yellow C, Diaresin Orange G, Diaresin Orange K, Diaresin Violet A, Diaresin Violet D, Diaresin Blue P, Diaresin Blue K, Diaresin Blue H, Diaresin Blue N and Diaresin Brown A (each supplied by Mitsubishi Chem. Ind. Ltd.), and Sumiplast Red AS, Sumiplast Red 3B, Sumiplast Yellow FC, Sumiplast Yellow F5G, Sumiplast Orange G, Sumiplast Orange 3G, Sumiplast Violet RR, and Sumiplast Blue OA (each supplied by Sumitomo Chem Co.). As the organic pigment, there can be mentioned Permanent Red 4R, Fast Yellow GR, Fast Orange RR, Fast Violet R, Cyanine Blue B and Cyanine Blue BF (each supplied by Dainichiseika Color and Chemicals Mfg. Co.), and Cyanine Blue BN, Cyanine Green NB and Cyanine Green NY (each supplied by Toyo Ink Mfg. Co.). Inorganic pigments customarily used, for example, titanium dioxide, barium sulfate, prussian blue, ultramarine and carbon black, may be used. The amount of the colorant added is changed according to the kind of the dye or pigment, but it is preferred that the colorant be used in an amount of 0.01 to 5 parts by weight, especially 0.5 to 5 parts by weight, per 100 parts by weight of the polymerizable material.

The colored polymerizable material may be obtained by incorporating a powdery or pasty pigment or dye into the polymerizable material. When a pigment is used, there may be adopted a method in which the pigment is dispersed at a high concentration in the polymerizable material, a polymerization initiator is added to the mixture, polymerization is carried out, and the obtained colored polymer is pulverized and added to the polymerizable material.

Figure 3:
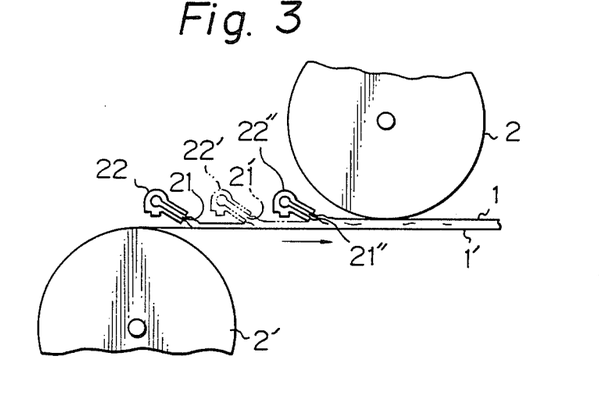
FIGS. 3 and 4 are front and top views illustrating an example of the method for supplying colored polymerizable materials to the polymerization apparatus.
Figure 4:
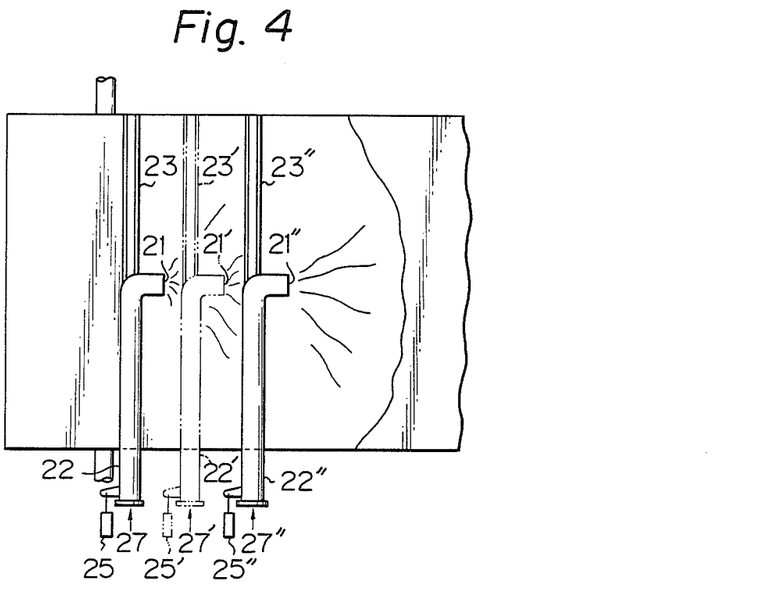
Figure 5:
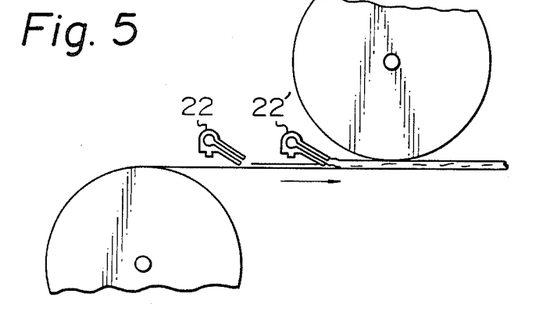
FIGS. 5 and 6 are front and top views illustrating another example of the method for supplying colored polymerizable materials to the polymerization apparatus.
Figure 6:
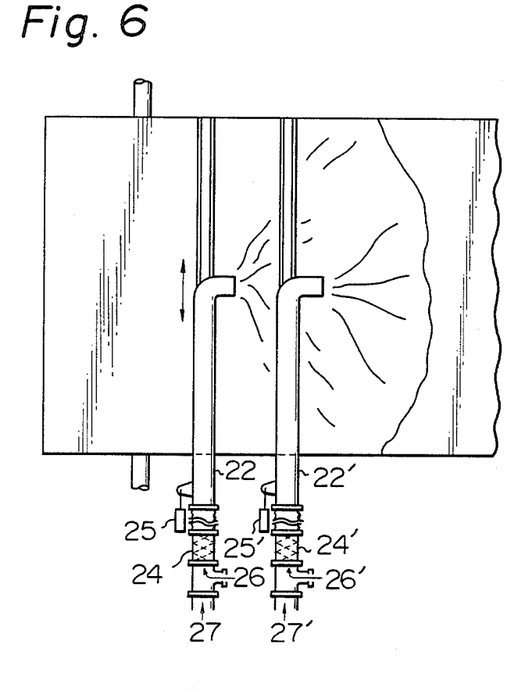
Figure 7:
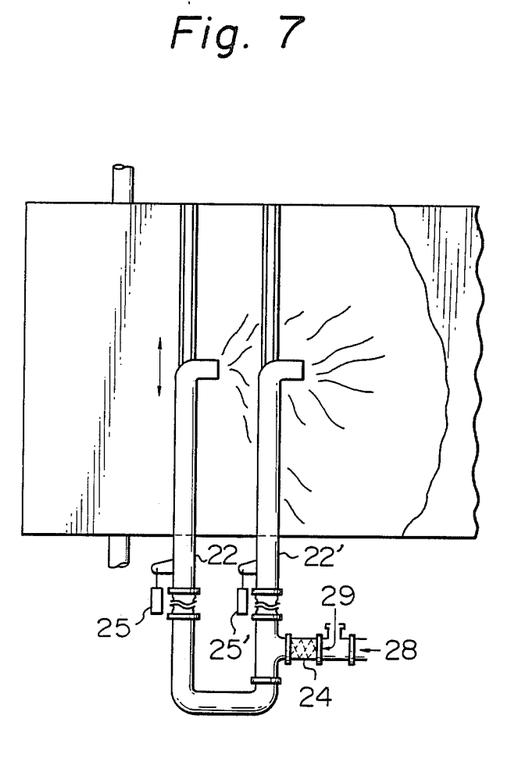
FIG. 7 is a top view illustrating still another example of the method for supplying colored polymerizable materials to the polymerization apparatus.

Colored polymerizable materials are supplied from at least two supply means, and the colors of these colored polymerizable materials are made different from each other or they are formed into a laminar flow comprising a plurality of colored polymerizable materials differing in color. Moreover, the above two procedures may be adopted in combination. The supplying method is not particularly critical, so far as the above requirement is satisfied. For example, as shown in FIGS. 3 and 4, polymerizable materials containing colorants different in color, respectively, are independently supplied to the at least two supply means 22, 22', and 22". Moreover, there may be adopted a method in which, as shown in FIGS. 5, 6 and 7, base polymerizable materials 26 and 26' and colorant-containing polymerizable merizable materials 27 and 27' are mixed in a stationary type mixer to prepare a plurality of colored polymerizable merizable materials differing in color, and they are independently supplied to supply means 22 and 22'. Furthermore, there may be adopted a method in which, as shown in FIG. 7, at least two polymerizable materials 28 and 29 containing colorants differing in color, respectively, are introduced into a stationary type mixer 24 where they are lightly mixed and taken out in the form of a laminar flow composed of a plurality of polymerizable materials differing in color. This laminar flow is then divided and supplied to the respective supply means. At any rate, the laminar flow of a plurality of the thus-prepared polymerizable materials different in color, is supplied to at least one supply means.

The kind and structure of the mixer 24 of the stationary type used for forming a laminar flow of polymerizable materials differing in color are not particularly critical, so far as the objects of the present invention can be attained. For example, a static mixer comprising mixing elements arranged in a tube, which is supplied by Kennix Co., or a mixer comprising extrusion openings alternately provided, as disclosed in Japanese Examined Patent Publication No. 60-9714, may be adopted.

If a stationary type mixer having a high mixing capacity is used, a laminar flow composed of a plurality of polymerizable materials different in color cannot be formed. Therefore, when a stationary type mixer is used, the length of the mixer and the structure and number of elements should be appropriately selected.

A polymerization initiator is ordinarily incorporated into the colored polymerizable material to be supplied to the supply means. As the polymerization initiator, there may be used free radical polymerization initiators such as azobisisobutyronitrile, azobisdimethylvaleronitrile, benzoyl peroxide, lauroyl peroxide, acetyl peroxide, capryl peroxide, 2,4-dichlorobenzoyl peroxide, isopropyl peroxide and acetylcyclohexylsulfonyl peroxide. These initiators may be used alone or in the form of a mixture of two or more. The polymerization initiator is used in an amount of 0.02 to 0.5% by weight based on the polymerizable material.

In the present invention, in order to improve the physical properties of the obtained resin, a crosslinking agent and a chain transfer agent may be added to the polymerizable material according to need.

As the crosslinking agent, there can be mentioned glycol diacrylates and dimethacrylates such as ethylene glycol diacrylate, ethylene glycol dimethacrylate, triethylene glycol diacrylate, triethylene glycol dimethacrylate, tetraethylene glycol diacrylate, tetraethylene glycol dimethacrylate, 1,3-butylene glycol diacrylate, 1,3-butylene glycol dimethacrylate, polyethylene glycol diacrylate, polyethylene glycol dimethacrylate, propylene glycol diacrylate, propylene glycol dimethacrylate, dipropylene glycol diacrylate, dipropylene glycol dimethacrylate, neopentyl glycol diacrylate, and neopentyl glycol dimethacrylate; diol diacrylates and methacrylates such as 1,3-propanediol diacrylate, 1,3-propanediol dimethacrylate, 1,4-butanediol diacrylate, 1,4-butanediol dimethacrylate, 1,6-hexanediol diacrylate, and 1,6-hexanediol dimethacrylate; polyfunctional acrylates and methacrylates such as trimethylolpropane triacrylate, triemthylolpropane trimethacrylate, pentaerythritol triacrylate, pentaerythritol trimethacrylate, pentaerythritol tetraacrylate, and pentaerythritol tetramethacrylate; allyl acrylate, allyl methacrylate, diallyl maleate, vinyl methacrylate and divinylbenzene. These crosslinking agents may be used alone or in the form of a mixture of two or more. The amount of the crosslinking agent is 0.02 to 1.0% by weight based on the polymerizable merizable material.

As the chain transfer agent, there may be used mercaptans, such as alkyl mercaptane having up to 20 carbon atoms, especially n-alkyl mercaptans having 4 to 20 carbon atoms, and aryl mercaptans in which the aryl group is phenyl or naphthyl and which may have an alkyl group (having 1 to 12 carbon atoms) or a halogen atom (Cl, Br or I) as the substituent, and polyhaloalkanes (preferably having 1 to 5 carbon atoms).

In the present invention, an ultraviolet absorber, a surface active agent, a releasing agent, and a flame retardant may be further incorporated as additives.

In carrying out the present invention, colored polymerizable materials are prepared and supplied to a plurality of supply means so that a plate having a desirable flow pattern of different colors is obtained, and the polymerizable materials are supplied to the polymerizable material supply region of the polymerization apparatus from supply openings of the supply means while reciprocating all of the supply means in the direction of the width of the belts or while keeping at least one of the supply means stationary and reciprocating the remaining supply means in the direction of the width of the belts.

The colored polymerizable materials extruded from the supply openings flow onto each belt to form an irregular flow pattern of different colors, and the polymerizable materials are introduced into the molding space of the polymerization apparatus where the materials are polymerized and cured. The polymerization in the continuous plate-preparing apparatus can be carried out according to methods proposed by us in Japanese Examined Patent Publication No. 47-33494, Japanese Examined Patent Publication No. 47-33495, Japanese Examined Patent Publication No. 47-33496, Japanese Examined Patent Publication No. 52-30985, and Japanese Unexamined Patent Publication No. 60-9714. When at least one supply means is kept stationary in supplying the colored polymerizable merizable materials, it is preferred that the supply means located upstream of the supply means kept stationary be reciprocated in the direction of the width of the belts, because, in this way, a flow pattern becomes prominent.

In general, there is preferably adopted a method in which the colored polymerizable materials are supplied into the polymerizable material supply region from the respective supply means while reciprocating the supply opening of the supply means arranged on the upstream end in the direction of the width of the belts and keeping stationary the supply opening of the supply means located on the downstream end or reciprocating the supply opening of the supply means located on the downstream end in the direction of the width of the belts at an amplitude smaller than that of the reciprocating movement of the supply opening of the supply means located on the upstream end. According to this method, a prominent flow pattern can be formed.

Furthermore, there may be adopted a method in which the colored polymerizable materials are extruded from the supply opening of the supply means at the same or different rates and supplied into the polymerization apparatus. According to this method, thick portions and thin portions can be formed in flow pattern lines, and a resin plate having improved fashion and design characteristics can be obtained.

The flow pattern of different colors formed in the resin plate prepared according to the process of the present invention, extends from the surface to the interior.

The resin plates having a desirable thickness, for example, a thickness of 2 to 10 mm can be obtained.

The process of the present invention will now be described in detail with reference to the following examples that by no means limit the scope of the invention.

In the examples, the apparatuses as shown in FIGS. 1 through 8 were used.

EXAMPLE 1

An opaque black polymerizable material formed by adding 0.5% by weight of a black pigment to a transparent polymerizable material solution formed by adding 840 ppm of azobisdimethylvaleronitrile as a polymerization initiator and 100 ppm of Tinuvin-P (supplied by Ciba-Geigy) as an ultraviolet absorbent to a methyl methacrylate syrup having a viscosity of 12 poise as measured at 20° C. and a polymer content of 24% by weight and an opaque white polymerizable material formed by adding 2% by weight of a white pigment to the above-mentioned transparent polymerizable material solution were deaerated under reduced pressure and were supplied at a weight ratio of ½ at a total rate of 21.3 kg/min to a stationary type mixer 24 shown in FIG. 7 (static mixer provided with 3 elements; supplied by Kennix Co.) by a gear pump, and the polymerizable materials were lightly mixed to form a black laminar flow composed of a plurality of polymerizable materials of different colors.

This laminar flow was divided into substantially equal parts, and the parts were supplied to two pipe type supply means 22 and 22', each having a diameter of 40 mm and provided with supply opening having a diameter of 40 mm. One supply means 22 was continuously reciprocated along a width of 30 cm in the region of from the upstream end of the belts to the central portion thereof at a speed such that 30 seconds were required for the movement of one way while stopping the supply means 22 at each end for 10 seconds. The other supply means 22' was fixed in the central portion of the belts at a portion 200 mm downstream of the supply means 22.

Figure 9:
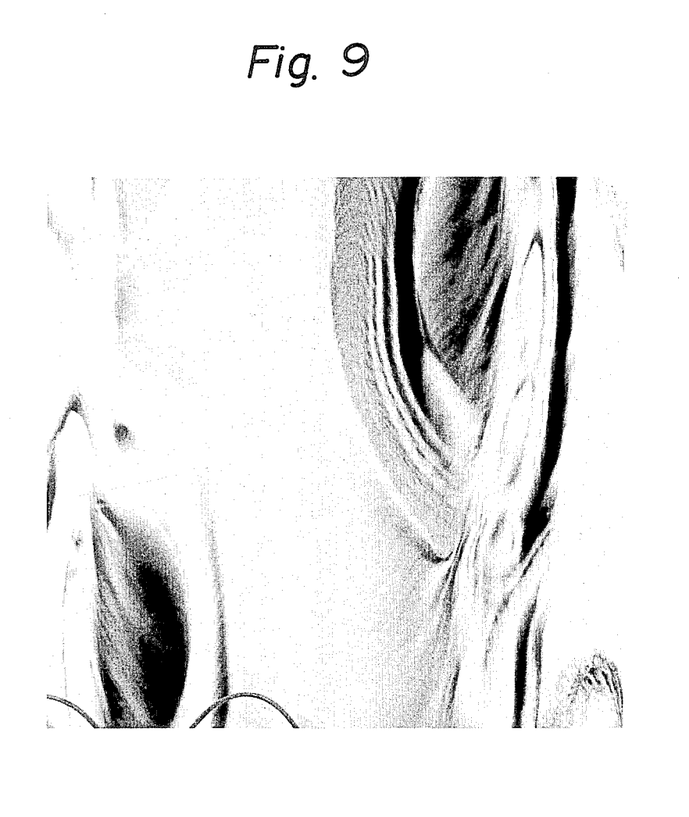
FIGS. 9, 10 and 11 are photographs of the appearances of resin plates obtained in the examples of the process of the present invention.

The laminar flow of the colored polymerizable materials extruded from the supply openings of the respective supply means was introduced in a molding space defined by the endless belts of stainless steel and polyvinyl chloride gaskets In a first polymerization zone, the polymerizable materials were heated and polymerized by spraying warm water maintained at 76° C. on the back faces of the belts, and in a second polymerization zone, heating was effected at 120° C. by a far infrared heater. The polymerization product was cooled to 80° C. to 90° C. in a cooling zone and then taken out. Thus, a resin plate having a thickness of 3.2 mm and width of 2800 mm and an irregular flow pattern of white, black, and gray colors, as shown in FIG. 9, was obtained.

EXAMPLE 2

An opaque brown polymerizable material formed by adding 2.13% by weight of a brown pigment formed by mixing several pigments to a transparent polymerizable material solution obtained by dissolving 670 ppm of azobisdimethylvaleronitrile as a polymerization initiator, 100 ppm of Tinuvin P and 20 ppm of dioctyl sulfosuccinate in the methyl methacrylate syrup described in Example 1, and an opaque white polymerizable material obtained by adding 2% by weight of a white pigment to the above transparent polymerizable material solution were deaerated under reduced pressure and were slightly mixed by a stationary type mixer under the same conditions as described in Example 1 to obtain a laminar flow composed of a plurality of polymerizable materials differing in color.

In the same manner as described in Example 1, the laminar flow was divided into substantially equal parts and supplied to two pipe type supply means having a diameter of 40 mm. One supply means (having one supply opening having a diameter of 40 mm) was reciprocated at a width of 30 cm in the region of from the upstream end of the belts to the central portion thereof at a speed such that 30 seconds were required for the movement of one way while stopping the supply means at each end for 10 seconds. The other supply means was a multiplehole hole injector having 13 supply openings having diameters of 3 to 8 mm (the top end width was 960 mm), and this supply means was fixed in the central portion of the belts 200 mm downstream of the above supply means.

Figure 10:
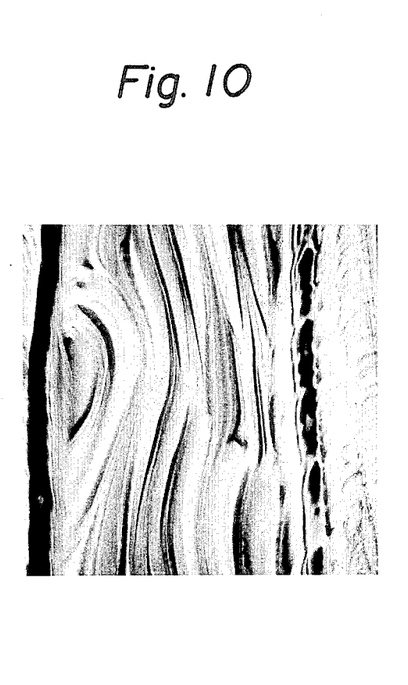

The colored polymerizable materials of the laminar flows extruded from the supply openings of the respective supply means were polymerized under the same conditions as described in Example 1 to obtain a resin plate having a thickness of 3.2 mm and a width of 2800 mm and an irregular flow pattern of a white color, a brown color, and a mingled color, as shown in FIG. 10.

For comparison, the polymerization was carried out in the same manner as described above except that the supply means arranged on the upstream end was not reciprocated on the belts but was fixed in the central portion of the belts. An irregular flow pattern was not formed, but a linear pattern plate was obtained.

EXAMPLE 3

Figure 11:
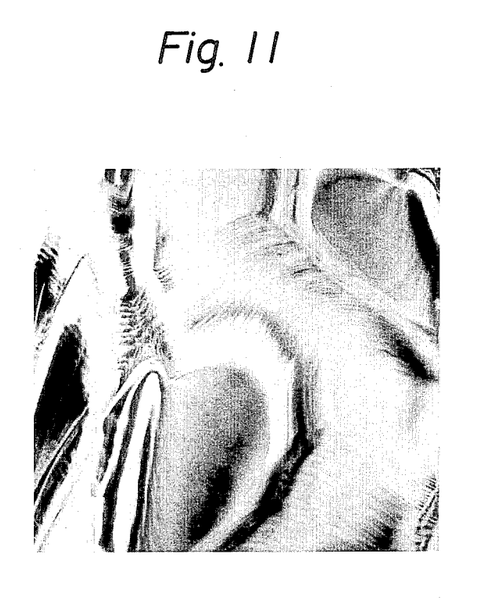

The polymerization was carried out in the same manner as described in Example 1 except that both the supply means were reciprocated in the central portion of the belts at a width of 30 cm at a speed such that 30 seconds were required for the movement of one way while stopping the supply means for 10 seconds at each end. A resin plate having an irregular flow pattern of a white color, a brown color, and a mingled color, as shown in FIG. 11, was obtained.

A resin plate having an irregular flow pattern of different colors, which is obtained according to the process of the present invention having the above-mentioned structure, is superior to conventional resin plates of different colors in fashion and design characteristics and, further, has an excellent durability and weatherability. Therefore, the resin plate of the present invention can be used in various fields, for example, as sanitary surface decorative plates for bath tubs, washstands and the like and for the fabrication of interior furniture, display stands, and various partition plates.

We claim:

1. A process for the continuous preparation of synthetic resin plates having an irregular flow pattern of different colors by continuously polymerizing polymerizable materials in a polymerization zone defined by confronting surfaces of two confronting and running endless belts and gaskets held between the confronting surfaces of the belts, wherein polymerizable materials of different colors are supplied in the polymerizable material supply region close to the upstream end of the polymerization zone by a plurality of supply means, each supply means including at least one polymerizable material supply opening to the polymerizable material supply region and said supply means being arranged in such a manner that they are spaced from one another in the direction of travel of the belts;

the colored polymerizable materials are supplied into the polymerizable material supply region from the respective supply means while the supply opening of the supply means arranged on the upstream end in the width direction of the belts is reciprocated; the supply opening of the supply means arranged on the downstream end is kept stationary or reciprocated in the width direction of the belts at an amplitude smaller than the amplitude of the reciprocative movement of the supply opening of the supply means arranged on the upstream end; and the colors of the colored polymerizable materials supplied from at least two of the supply means are made different from each other or the colored polymerizable material supplied from at least one of the supply means is formed into a laminar flow composed of a plurality of polymerizable materials differing in the color.

2. A process according to claim 1, wherein the polymerizable material is a prepolymer of methyl methacrylate or a mixture of methyl methacrylate with other copolymerizable monomer.

3. A process according to claim 1, wherein the polymerizable material is an unsaturated polyester resin.

4. A process according to claim 1, wherein two polymerizable material supply means are arranged.

5. A process according to claim 1, wherein at least two polymerizable materials containing colorants differing in the color are introduced into a mixer of the stationary type and are slightly mixed and are taken out in the form of a laminar flow composed of a plurality of materials differing in color, and the laminar flow is supplied to at least one of the polymerizable material supply means.

* * * * *